(No Model.)
E. CLIFF.
CAR WHEEL.
No. 305,671. Patented Sept. 23, 1884.
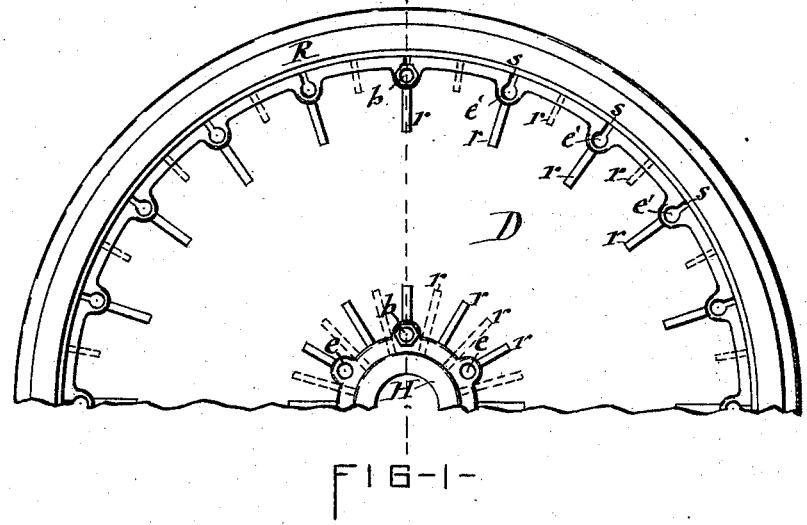
FIG-1-
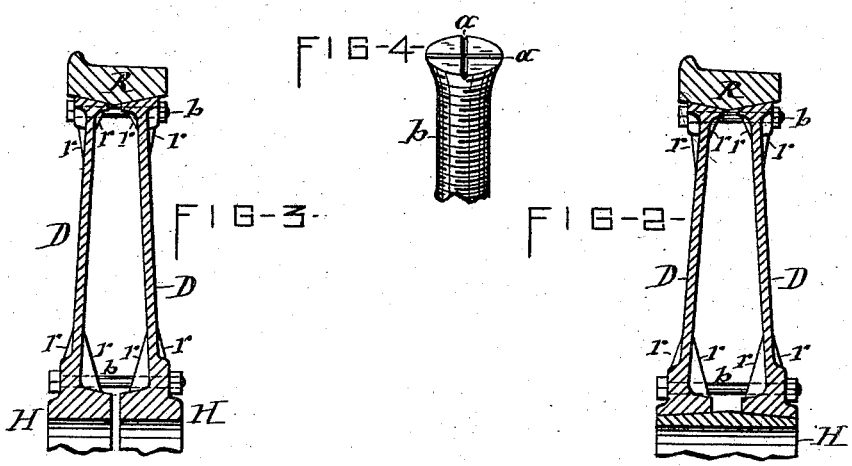
ATTEST—
INVENTOR—
Edward Cliff

UNITED STATES PATENT OFFICE.

EDWARD CLIFF, OF OSWEGO, NEW YORK, ASSIGNOR OF ONE-HALF TO EDMUND K. RIGHTER, OF SAME PLACE.

CAR-WHEEL.

SPECIFICATION forming part of Letters Patent No. 305,671, dated September 23, 1884.

Application filed March 22, 1884. (No model.)

*To all whom it may concern:*

Be it known that I, EDWARD CLIFF, of Oswego, in the county of Oswego, in the State of New York, have invented new and useful Improvements in Metallic Wheels, of which the following, taken in connection with the accompanying drawings, is a full, clear, and exact description.

This invention consists in a novel construction of a metallic wheel which can be taken apart for repairs or renewal of one or more of its component parts, and has its members adjustably united, so as to admit of tightening the joints thereof and compensating for the expansion which may be produced in the peripheral rim or tire by the travel of the wheel upon a metal rail.

The invention also consists in certain novel features in the details of the aforesaid wheel, whereby the same is strengthened and the liability of the cracking of the same is to a great extent obviated.

The invention is fully illustrated in the annexed drawings, wherein Figure 1 is a side view of one half of a car-wheel embodying my invention. Fig. 2 is a transverse section of the same. Fig. 3 is a transverse section illustrating modifications of my invention; and Fig. 4 is an enlarged detail view of the screw-threaded end of one of the clamping-bolts, showing the means for retaining the nut thereon.

Similar letters of reference indicate corresponding parts.

R represents the peripheral rim of the wheel, which rim may be either flanged to form the tread or tire of a car-wheel, or have a plain outer face similar to that of a pulley carrying a driving-belt. The inner circumferential face of the aforesaid rim is made flaring or beveling from the center of the plane of the rim toward opposite sides thereof, and to each of said beveled portions of the rim is fitted a web or disk, D, having a correspondingly-beveled peripheral face.

H is the hub of the wheel, having its external circumference beveled from the center to opposite ends of the hub, and consequently beveled converse in relation to the bevels of the rim R.

On the beveled faces of the hub H are seated the inner circumferences or central eyes of the disks D D, formed with correspondingly-beveled bearings. The disks are applied to the rim R and hub H from opposite sides, and drawn toward the center of the plane of the wheel, and thus clamped on the rim and hub by means of bolts $b$ $b$, passing through holes $e$ and $e'$, respectively, near the inner and outer peripheries of the disks, the bolts being provided with a head at the outer side of one of the disks, and with a nut at the outer side of the other disk, and by tightening the nuts the disks are drawn toward each other until they become effectually wedged between the rim and hub. Thus it will be observed that, in case the rim becomes expanded by rolling on a metal rail, the disks D can be crowded toward each other or toward the center of the plane of the wheel to compensate for the aforesaid expansion.

In wheels which are mounted movably on the shaft or axle, the hub H may be made of two transversely-divided sections formed integral with the respective webs or disks D D, as represented in Fig. 3 of the drawings, in which case a space is to be left between said hub-sections to admit of the hereinbefore-described clamping of the disks D D or the peripheral rim R. In order to prevent the nuts of the bolts $b$ from working loose, I cut, by means of a cold-chisel, transverse slots $a$ $a$ in the screw-threaded end of the bolt $b$, thereby upsetting said portion of the bolt, as illustrated in Fig. 4 of the drawings. Said upsetting over the outer face of the nut serves to securely retain the latter on the bolt. From the bolt-holes $e$ $e'$ to the peripheries of the disks I provide the latter with slots or incisions $s$, which, in conjunction with the enlarged round apertures $e$ $e'$ at the inner end of the slots, serve to prevent the wheel from cracking, which latter is to be more particularly guarded against in the process of cooling the same after they are cast.

$r$ $r$ represent radial ribs extended from the peripheral bearings of the disks, and preferably alternately on the inner and outer sides of the disks, the inner ribs being represented by dotted lines in Fig. 1 of the drawings, said ribs serving to brace or re-enforce the disks.

I am aware that disks having an inclined bearing upon the corresponding inclines of a rim have been secured to the rim by the binding friction of the spindle. I provide positive means for taking up slackness of the parts, and to this end deem the bolts important.

I am aware also of English Patent No. 2,365 of 1861, and do not seek to cover the construction therein set forth.

What I claim as new is—

1. In a wheel substantially as described, the disks D, or equivalent sustaining-web, having radial incisions terminating in enlarged apertures, as shown, the said apertures serving as holes for the securing-bolts, as set forth.

2. In a wheel substantially as described, the webs D, having incisions terminating in bolt-holes, with strengthening radial ribs extending inward from said holes, and having also radial ribs $r$ arranged alternately on opposite faces, near the hub periphery, as set forth.

3. In combination with the rim R and hub H, each having inclined seats, as shown, the disks D, having incisions $s\ e'$ and ribs $r$, and the bolts $b$, as specified.

In testimony whereof I have hereunto signed my name and affixed my seal, in the presence of two attesting witnesses, at Oswego city, in the county of Oswego, in the State of New York, this 17th day of March, 1884.

EDWARD CLIFF. [L. S.]

Witnesses:
　ALBERT N. RADCLIFFE,
　C. C. PLACE.